UNITED STATES PATENT OFFICE.

JOSEPH THOMPSON, OF NORTH WRENTHAM, MASSACHUSETTS.

IMPROVEMENT IN MASTIC COMPOSITIONS.

Specification forming part of Letters Patent No. 19,802, dated March 30, 1858.

*To all whom it may concern:*

Be it known that I, JOSEPH THOMPSON, of North Wrentham, in the county of Norfolk and State of Massachusetts, have made an Improvement in the Composition of Mastics; and I do hereby declare that the following is a full and exact description thereof.

The nature of my invention or improvement is the application of certain earthy bodies to form the mineral bases of cements or mastic compositions, instead of sand and other granular bodies, which have before been used. Thus I have discovered that there are finely-divided earths resulting from the decay of rocks, called "fuller's-earth," "Tripoli," and deposits formed under peat-bogs, which naturally possess an affinity for oils, pitch, tar, and bitumens, due to a state of slight alkalinity, which permits of the use of a large proportion of them in mixture with a very small proportion of oils or other similar bodies, pitch, tar, &c., for forming a mastic which becomes hard after exposure to air, but retains a certain elasticity. These characters do not belong to clays or pulverized bodies, and are found only in the slimy remains of rocks which contain silicates of the alkalies or lime. The silicates remaining in the slime are very slightly soluble in water; but they do impart a degree of alkalinity to it after the lapse of a short time, and I distinguish them by this property in manufacturing mastic.

I am aware that there are deposits of diatomaceæ, "infusorial earths," which are silicious, and other silicious collections more or less pure. These substances, I find, will not serve for my purposes, for, although they will mix with oils, resins, and bitumens, and become hard on cooling from a fluid state, they do not in any sense combine with these oily substances to form elastic compounds. It is necessary for the effect (which requires time) that the earthy material should be a very finely divided silicate naturally formed from a rock which contained silicates of the alkalies or lime. Fuller's-earth is the type of such silicates, and, as is well known, its detersive action on grease is due to its slightly-soluble silicates; and my invention relates to this property in such earths.

To enable others skilled in the art to make my improved mastic, I proceed to describe the operation.

For a cement or mastic which has a general application to the forming of floors, sidewalks, covering of walls and roofs, paper, and cloth, I use with the earthy material mixtures of cheap rosin-oil, residuums of distillation of fat-oils, tar, and bitumen in definite weights.

In a melting-kettle place twenty pounds rosin-oil, forty ounces of pine-tar, five ounces of asphaltum, five ounces of shellac, one pound residue of distilled palm-oil; melt by a gentle fire and stir in by small portions the natural mineral above described until on cooling a portion it ceases to flow. If the mastic is designed for transportation, I leave it just ready to flow by 100° Fahrenheit of heat, as reheating will cause it to become harder. Exposure to air dries this kind of mastic independently of the effect of cooling. Hence it must be finished softer than if it were a mere melted mixture, hardening when deprived of heat.

The mastic made with these alkaline earthy bodies contains a much larger proportion of mineral matter than can be found in any made in part of sand or gravel, for the particles of the new material are not rounded, and appear to arrange themselves in the mastic in the same position they originally had in the rock, and require very little binding or cementing action. If the cement or mastic is to be applied to upright walls, I use more of the residuum of palm-oil, adding five ounces of shellac for every additional gallon of oil residuum weighing ten pounds, which causes it to dry with a "skin-like" paint. Any of the ordinary mixtures of tar and pitch will also harden and remain elastic with the mineral bodies described.

I do not claim any particular oily residue or mixture of tar, pitch, or bitumen as a component part of a mastic, but use such of them as are best adapted to mixing with the new material, which serves as a basis; nor do I claim or use sand, brick-dust, gravel, or any of the earths and oxides heretofore used in such mixtures.

What I claim, and desire to secure by Letters Patent, is—

The right of using the naturally finely-divided remains of silicious rocks which have an alkaline action on test-paper, as fuller's-earth, instead of sand, gravel, or other solid material.

JOSEPH THOMPSON.

Witnesses:
SAML. WARNER, Jr.,
HARRIETT EVERETT.